US008275499B2

(12) United States Patent
Coulmeau et al.

(10) Patent No.: US 8,275,499 B2
(45) Date of Patent: Sep. 25, 2012

(54) DEVICE FOR CALCULATING A FLIGHT PLAN OF AN AIRCRAFT

(75) Inventors: Francois Coulmeau, Seilh (FR); Manuel Gutierrez-Castaneda, Toulouse (FR); Nicolas Marty, Saint Sauveur (FR)

(73) Assignee: Thales, Neuilly sur Seine (FR)

( * ) Notice: Subject to any disclaimer, the term of this patent is extended or adjusted under 35 U.S.C. 154(b) by 470 days.

(21) Appl. No.: 12/579,272

(22) Filed: Oct. 14, 2009

(65) Prior Publication Data

US 2010/0100308 A1 Apr. 22, 2010

(30) Foreign Application Priority Data

Oct. 17, 2008 (FR) ..................................... 08 05767

(51) Int. Cl.
*G01C 23/00* (2006.01)
*G06G 7/78* (2006.01)

(52) U.S. Cl. .............. 701/14; 701/7; 701/122; 701/533; 244/175; 382/283

(58) Field of Classification Search .................. 701/122, 701/515
See application file for complete search history.

(56) References Cited

U.S. PATENT DOCUMENTS

| | | | | |
|---|---|---|---|---|
| 6,199,008 | B1 * | 3/2001 | Aratow et al. | 701/120 |
| 6,381,538 | B1 | 4/2002 | Robinson et al. | |
| 6,744,382 | B1 * | 6/2004 | Lapis et al. | 340/971 |
| 7,433,781 | B2 | 10/2008 | Bitar et al. | |
| 7,493,197 | B2 | 2/2009 | Bitar et al. | |
| 7,583,856 | B2 | 9/2009 | Bitar et al. | |
| 7,729,817 | B2 * | 6/2010 | Duranti et al. | 701/11 |
| 7,925,394 | B2 * | 4/2011 | Deker et al. | 701/18 |
| 7,937,191 | B2 * | 5/2011 | Ivansson et al. | 701/4 |
| 8,060,295 | B2 * | 11/2011 | Estkowski et al. | 701/120 |
| 2007/0129855 | A1 | 6/2007 | Coulmeau | |
| 2007/0150117 | A1 | 6/2007 | Bitar et al. | |
| 2007/0187554 | A1 | 8/2007 | Bitar et al. | |
| 2007/0219705 | A1 | 9/2007 | Bitar et al. | |
| 2008/0046171 | A1 | 2/2008 | Bitar et al. | |
| 2008/0119971 | A1 | 5/2008 | Deker et al. | |

(Continued)

FOREIGN PATENT DOCUMENTS

DE 196 09 613 A1 9/1997

OTHER PUBLICATIONS

U.S. Appl. No. 12/160,796, filed Feb. 8, 2007, Francois Coulmeau.

*Primary Examiner* — Thomas G. Black
*Assistant Examiner* — Lin B Olsen
(74) *Attorney, Agent, or Firm* — LaRiviere, Grubman & Payne, LLP

(57) ABSTRACT

The invention relates to a device for formulating a flight plan ensuring sufficient safety margins for a duration of a few minutes in relation to the set of flight constraints that could arise and comprising means for:
detecting the surrounding moving objects (aircraft or meteorological phenomena),
evaluating their type and the danger that they represent,
formulating a reconfiguration flight plan ensuring a separation with these phenomena and taking best account of the constraints of the initially followed flight plan, avoiding prohibited or regulated airspaces and avoiding the surrounding relief with ad hoc operational margins.

10 Claims, 9 Drawing Sheets

U.S. PATENT DOCUMENTS

2008/0154493 A1 6/2008 Bitar et al.
2008/0174454 A1 7/2008 Bitar et al.
2008/0195264 A1 8/2008 Deker et al.
2008/0218384 A1 9/2008 Varadarajan et al.
2008/0306680 A1 12/2008 Marty et al.
2008/0312779 A1 12/2008 Sacle et al.
2009/0076717 A1 3/2009 Goutelard et al.
2009/0132103 A1 5/2009 Marty et al.

* cited by examiner

DEVICE FOR CALCULATING A FLIGHT PLAN OF AN AIRCRAFT

PRIORITY CLAIM

This application claims priority to French Patent Application Number 08 05767, entitled Device for Calculating a Flight Plan of an Aircraft, filed on Oct. 17, 2008.

TECHNICAL FIELD

The invention relates to the navigation of an aircraft whose flight plan is subject to flight constraints and relates, more particularly, to the calculation of a flight plan complying with these constraints.

An aircraft in flight is subject to various constraints influencing its navigation and more particularly impacting its flight plan. These constraints are, for example, obstacles, reliefs, regulated zones, other aircraft. Various systems have been developed for aiding a crew to formulate a flight plan complying with some of these flight constraints.

Such equipment includes the known FMS flight management systems comprising the following functions:

Navigation LOCNAV for performing optimal location of the aircraft as a function of geolocation means (GPS, GALILEO, VHF radio beacons, inertial platforms);

Flight plan FPLN for entering geographical elements constituting the skeleton of the route to be followed (departure and arrival procedures, waypoints, airways);

Navigation database NAVDB for constructing geographical routes and procedures on the basis of data included in bases (points, beacons, interception or altitude legs, etc.);

Performance database PRF DB containing the craft's aerodynamic and engine parameters;

Lateral trajectory TRAJ: for constructing a continuous trajectory on the basis of the points of the flight plan, complying with the aeroplane performance and with the confinement constraints (RNP);

Predictions PRED: for constructing a vertical profile optimized on the lateral trajectory;

Guidance, GUID, for guiding in the lateral and vertical planes the aircraft on its 3D trajectory, while optimizing the speed;

Digital datalink DATALINK, for communicating with the control centres and the other aircraft.

The functions accessible via an FMS, in particular for creating a flight plan, are insufficient to be certain of compliance with all the flight constraints. Indeed, the function for creating a flight plan does not check for intersection of the proposed trajectory with the elements surrounding the aircraft (relief, zones, other aircraft, etc.). Moreover, the FMS is not furnished with a digital terrain model making it possible to carry out the calculations regarding interference of the predicted trajectory with the relief. Nor is an FMS furnished with the capacity to detect surrounding aircraft or nearby meteorological phenomena.

Also known are ISS systems (the acronym standing for the expression Integrated Surveillance System) where its TAWS/TCAS/WXR independent modules fulfil a primary function of terrain anticollision surveillance (termed "Safety Net") and the aim of which is the emission of audible alerts upon an exceptional approach to the relief allowing the crew to react by engaging a vertical resource before it is too late.

Accordingly, the TAWS systems, decoupled from navigation systems, periodically compare the theoretical trajectory that would be described by the aircraft during a resource and compare it with a section of the terrain overflown obtained on the basis of a worldwide digital terrain model embedded aboard the computer.

The availability of a model of the terrain permits secondary functions making it possible to improve the perception of the situation of the crew ("Situation Awareness"). Among them, the THD ("Terrain Hazard Display") has the objective of representing the vertical margins relating to the altitude of the aircraft by false-colour slices presented on the navigation screen. The TAWSs of class A, compulsory for commercial transport aeroplanes, are generally furnished with a simplified cartographic mode having a few hypsometric slices, affording a representation of the terrain during cruising flight phases.

Representations by false colours are currently limited by display standards (of WXR type) and by the certification constraints which lead to the deliberate degradation of the resolution of the graphical representations proposed so as not to allow their use for navigation, incompatible with the certification level defined for a TAWS.

The functions carried out by an ISS are insufficient to be certain of compliance with all the flight constraints. Indeed, the resolution of the digital terrain models of the order of 15 arc seconds (or less) is too high in regard to the operational margins required for the situations envisaged and de facto non-certifiable for navigation functions. Moreover, the interfaces do not allow access to the navigation data, or to the performance model for making predictions of vertical profile, flight time and necessary fuel consumption. Finally the interfaces do not allow the formulation of a flight plan or the following thereof via the guidance system.

Finally, WUS systems are known (the acronym standing for the expression Weather Uplink System), which are devices allowing data communication between an aircraft and a device on the ground so as to load aboard the aircraft dynamically and in real time all the meteorological information which corresponds to the aircraft's current and forthcoming deployment zone.

On the ground, this system is in charge of recovering the meteorological data arising from multiple sources (radars, charts, predictions, satellites, etc.) and of providing the communication means making it possible to establish a data linkup with an aircraft.

Aboard the aircraft, this system is in charge of establishing the linkup with the device on the ground, of recovering the data and of making them available to the crew (graphically) or to other equipment so as to utilize them for the purposes of flight management or of avoiding zones that could become dangerous.

The functions carried out by a WUS are insufficient to achieve the objectives of the innovation. Indeed, the WUS is not furnished with a digital terrain model making it possible to carry out the calculations regarding interference of the predicted trajectory with the relief nor with the capacity to detect surrounding aircraft or nearby meteorological phenomena. Moreover, the interfaces do not allow access to the navigation data, or to the performance model for making predictions of vertical profile, flight time and necessary fuel consumption. Finally, the interfaces do not allow the formulation of a flight plan or the following thereof via the guidance system.

None of this equipment makes it possible to formulate a flight plan ensuring sufficient safety margins for a duration of a few minutes in relation to the set of flight constraints that could arise within a given perimeter: obstacles, reliefs, regulated zones, collaborative or non-collaborative aircraft.

The invention is aimed notably at alleviating the problems cited previously by proposing a device embedded aboard an aircraft capable of automatically proposing a revision of the flight plan followed so as to avoid, with sufficient safety margins and over a time horizon of a few minutes, all the fixed obstructions (relief, obstacles, regulated zones) and moving obstructions (aircraft, weather phenomena) in proximity to the aircraft.

SUMMARY OF THE INVENTION

For this purpose, the subject of the invention is a device for calculating a flight plan of an aircraft, the said flight plan making it possible to meet up with an initial flight plan, the said aircraft comprising sensors for detecting surrounding moving objects and weather sensors for detecting meteorological phenomena, the said device being characterized in that it comprises means for:

- determining parameters characterizing the moving objects detected on the basis of data originating from the sensors for detecting surrounding aircraft,
- determining parameters characterizing the meteorological phenomena detected, on the basis of meteorological data originating from the weather sensors,
- calculating prohibited zones and their evolution over time on the basis of the parameters characterizing the aircraft and the meteorological phenomena detected, the said zones defining a space where the aircraft cannot fly,
- calculating zones reachable by the aircraft and their evolution over time on the basis of the position of the aircraft, of data describing regulated zones prohibited to navigation, of a digital terrain model, of a list of obstacles and prohibited zones calculated,
- selecting a joining point meeting up with the initial flight plan situated in a reachable zone,
- calculating a joining flight plan for meeting up with the selected joining point.

According to a characteristic of the invention, the calculation of the joining flight plan is iterated at regular intervals, a flight plan being evaluated as a function of a quality criterion and a joining flight plan calculated at a given iteration, termed the new flight plan, becomes the flight plan followed by the aircraft if a joining flight plan, calculated at a previous iteration and followed by the aircraft, termed the current flight plan, exhibits an evaluation, within the sense of the quality criterion, for which the difference with the evaluation of the new calculated flight plan is above a given threshold.

According to a characteristic of the invention, the calculation of reachable zones comprises an estimation of the distances of the points in a map obtained by projection on a horizontal plane of a 3D representation of a deployment space by a mesh of elementary cubes that are associated with danger levels and are labelled by an altitude, a latitude, a longitude and a date, the said estimation consisting in applying a distance transform, the cubes associated with danger levels greater than an admissible value $N_1$ labelling the zones prohibited for the aircraft; the said distance transform estimating the distances of the various points of the image with respect to a source point representing the position of the aircraft by applying, by scanning, a mask to the various points of the image; a determined initial distance value being assigned, at the start of the scan, to all the points of the image except to the source point, the origin of the distance measurements, to which a zero distance value is assigned.

According to a characteristic of the invention, the estimation of distance from the source point to a point considered $P_{i,j}$, termed the aim point, being placed in a determined box of the mask, consists for each neighbouring point $P_V$ entering the boxes of the mask and whose distance having already been estimated in the course of the same scan in:

- reading the estimated distance $D_V$ of the neighbouring point $P_V$,
- reading a coefficient $C_{XY}$ of the mask corresponding to the box occupied by the neighbouring point $P_V$,
- calculating a propagated distance $D_P$ corresponding to the sum of the estimated distance $D_V$ of the neighbouring point $P_V$ and of the coefficient $C_{XY}$ assigned to that box of the mask occupied by the neighbouring point $P_V$:

$$D_P = D_V + C_{XY},$$

- calculating a foreseeable altitude $A_P$ of the aircraft after crossing the distance $D_P$,
- calculating a propagated date Tp at the position after crossing the distance $D_P$,
- reading a foreseeable danger level $N_{i,j,Ap,Tp}$ of the aim point $P_{i,j}$ in the representation as elementary cubes of the airspace at the foreseeable altitude $A_P$ and at propagated date Tp,
- comparing the foreseeable danger level $N_{i,j,Ap,Tp}$ with a permitted limit value $N_1$ for the flight, increased by a safety margin Δ,
- eliminating the propagated distance $D_P$ if the foreseeable danger level $N_{i,j,Ap,Tp}$ is greater than that admissible for the flight increased by the safety margin Δ,
- if the foreseeable danger level $N_{i,j,Ap,Tp}$ increased by the safety margin Δ is below the limit $N_1$ fixed for the flight, reading the distance $D_{i,j}$ already assigned to the aim point considered $P_{i,j}$ and comparing it with the propagated distance $D_P$ (step 99),
- eliminating the propagated distance $D_P$ if it is greater than or equal to the distance $D_{i,j}$ already assigned to the aim point considered $P_{i,j}$, and
- replacing the distance $D_{i,j}$ already assigned to the aim point considered $P_{i,j}$ by the propagated distance $D_P$ if the latter is smaller,
- the elementary cubes exhibiting a smaller distance than the largest distance measurable on the image at the end of the scan being designated reachable zones.

According to a characteristic of the invention, the selection of the joining point comprises the calculation of a score C for points of the initial flight plan situated in a reachable zone, the point for joining the selected initial flight plan being that obtaining the best score C, the said score being calculated according to the following relation:

$$C = \left[ \left( \prod_{i=1}^{n} (1 + C_i)^{\alpha_i} \right)^{\frac{1}{\sum_{i=1}^{n} \alpha_i}} - 1 \right]$$

where Ci is a score allotted according to an evaluation criterion i, . . . and $\alpha_i$ is a value associated with the evaluation criterion i and reflecting its importance, i being a value lying between 1 and 5.

According to a characteristic of the invention, the parameters characterizing the moving objects detected comprise a speed, a position and a future flight plan.

According to a characteristic of the invention, the prohibited zone associated with a moving object characterized solely by its position is defined by a succession of concentric circles with radii obeying a time-dependent increasing law and whose centre is the position of the said moving object.

According to a characteristic of the invention, the prohibited zone associated with a moving object characterized by its position and by its speed vector is defined by a succession of cylinders, whose centres correspond to the position of the said moving object as predicted on the basis of the said speed vector, the said centres being spaced apart by a regular time interval p, the radii of the successive cylinders obeying a time-dependent increasing law complying with the following relation:

$$r_i + r_{i+1} > p$$

where p is the time interval separating the centres of two successive cylinders, $r_i$ and $r_{i+1}$ represent the radii of two successive cylinders.

According to a characteristic of the invention, the prohibited zone associated with a moving object characterized by its position and by its future flight plan is defined by a tube enveloping the flight plan.

According to a characteristic of the invention, the prohibited zone associated with a moving object characterized by its position and by its future flight plan is defined by a rectangular parallelepiped enveloping the flight plan.

BRIEF DESCRIPTION OF THE DRAWINGS

The invention will be better understood and other advantages will become apparent on reading the detailed description given by way of nonlimiting example and with the aid of the figures among which.

DETAILED DESCRIPTION OF THE INVENTION

The device according to the invention can be used notably for:

- civilian transport aircraft so as to relieve the pilot of some of the actions or to rethink—under certain conditions—the apportioning of roles with the air traffic control,
- business transport or general aviation aircraft operated in uncontrolled airspaces,
- military aircraft operated in uncontrolled civilian airspaces or segregated tactical airspaces, in which a set of potentially discreet and/or hostile aircraft is operating.

The device according to the invention can be used to calculate a joining trajectory enabling an aircraft to meet up with its initial trajectory. Such a device can also be used to modify the initial trajectory of the aircraft when a new threat (a meteorological phenomenon or a moving object) is apparent. The time horizon for detection and reconfiguration of the route is of the order of a few minutes (2 for example), fulfilling the conventional separation requirements for aircraft deploying in civilian airspaces.

The formulation of a flight plan ensuring sufficient safety margins for a duration of a few minutes in relation to the set of flight constraints that could arise poses notably the following problems:

- the detection of surrounding moving objects (aircraft or weather phenomena),
- the evaluation of their type and the danger that they represent,
- the formulation of a reconfiguration flight plan ensuring a separation with these phenomena and:
  - taking best account of the constraints of the initially followed flight plan,
  - avoiding prohibited or regulated airspaces,
  - avoiding the surrounding relief with ad hoc operational margins.

When the separation can no longer be complied with, the problem then consists in formulating an avoidance manoeuvre. A system embedded aboard an aircraft, for preventing ground collisions, of TAWS type, providing assistance to the crew with the determination of an effective terrain lateral avoidance trajectory in the case of substantiated risk of collision with the ground is known, for example, through French patent No. 2 893 146.

Figure 1:
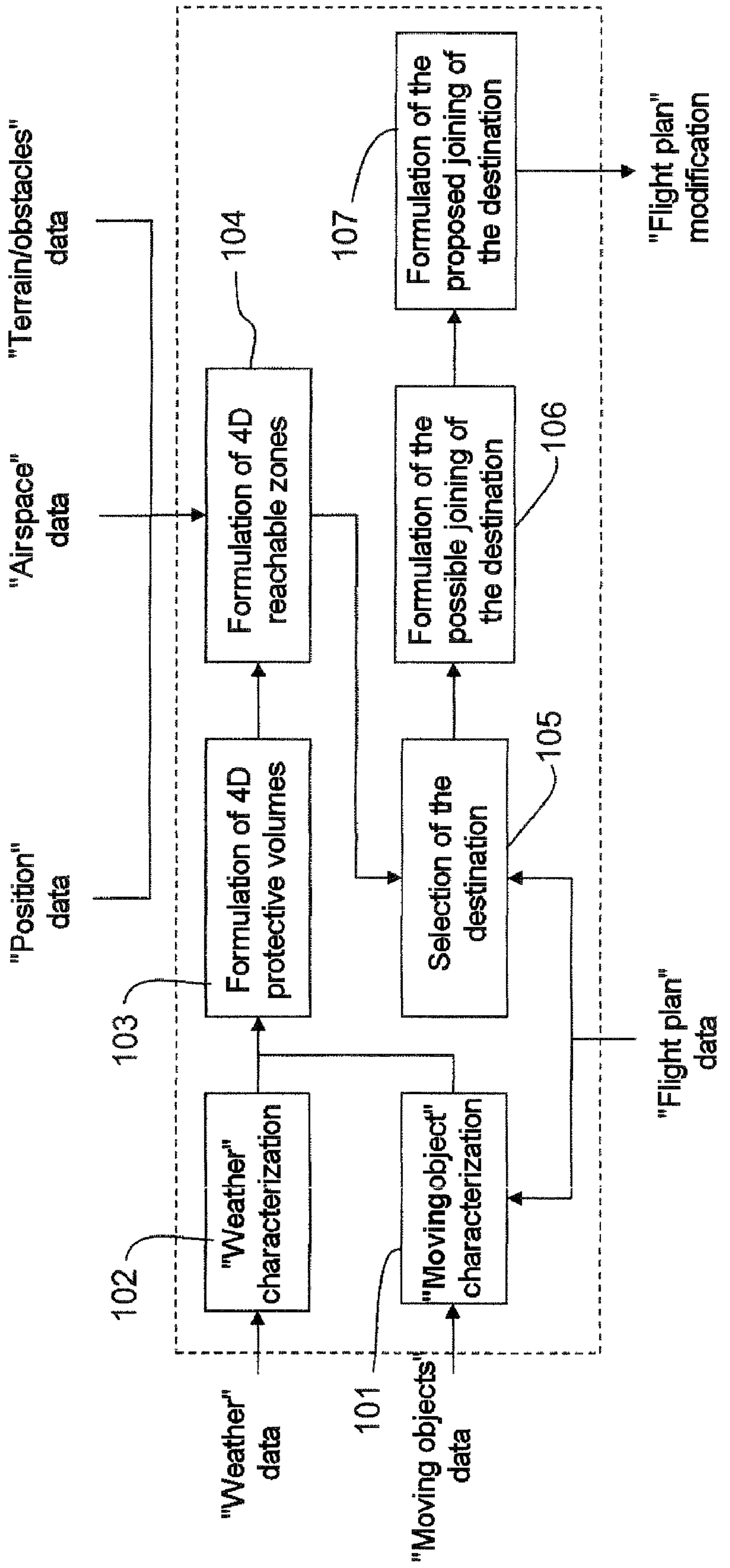
FIG. 1 represents an exemplary embodiment of the device according to the invention.
Figure 2:
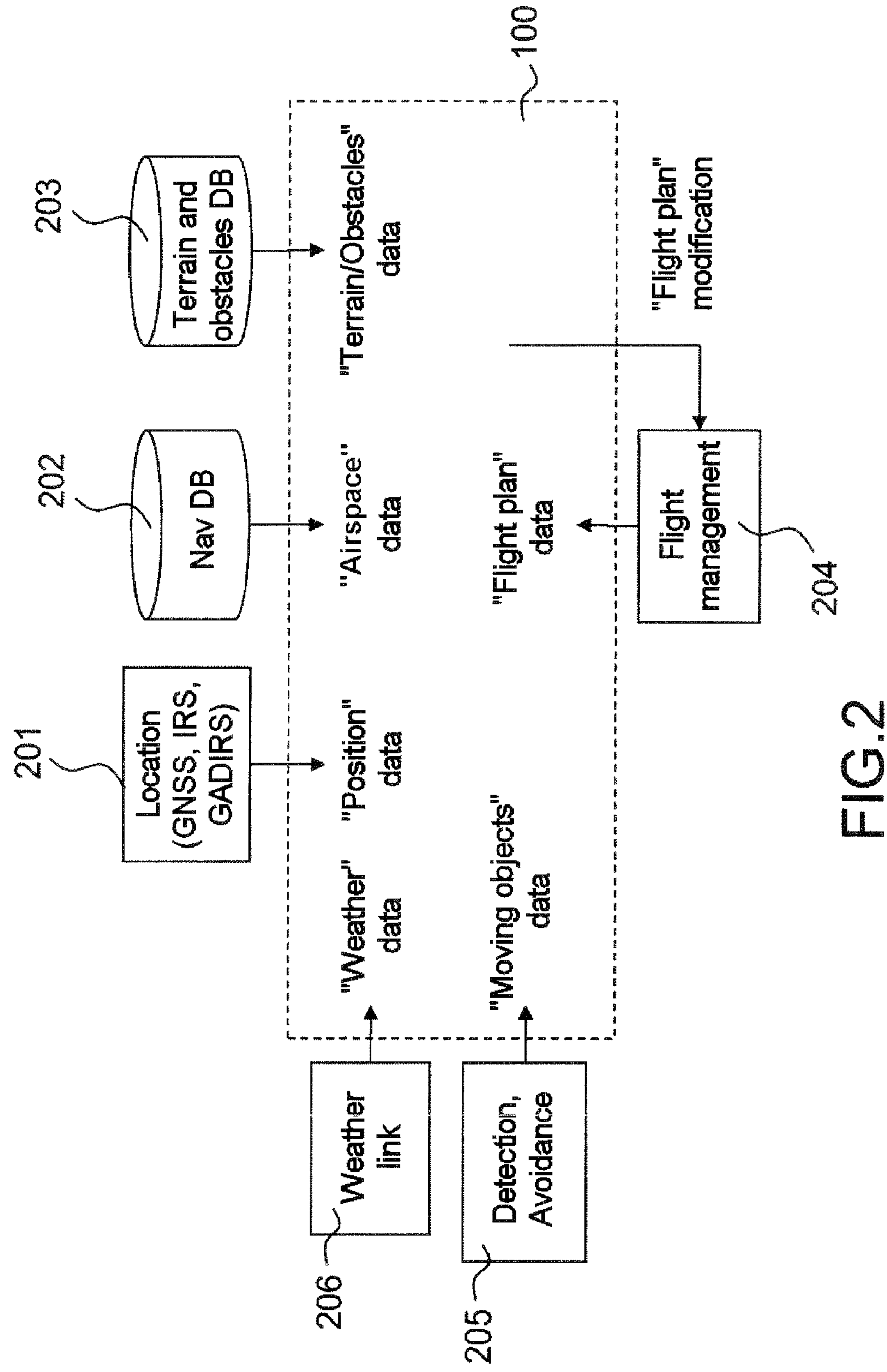
FIG. 2 represents the interfaces of the device according to the invention.

FIG. 1 represents an exemplary embodiment of the device according to the invention. FIG. 2 represents the interfaces of the device according to the invention. This device 100 comprises a calculation and processing module (CPU, memory, etc.). It communicates with:

- location devices 201 providing the position of the aircraft,
- a database 202 of regulated or restricted air zones. This base can be updated dynamically (activation of certain regulated or restricted zones, displacement of the meteorological phenomena, displacement of prohibited overflight zones for the tactical military zones, etc.),
- a database 203 of elevations of the surrounding terrain and of obstacles,
- a flight management system 204 for recovering the flight plan data and for communicating the calculated joining flight plan thereto,
- sensors for detecting surrounding moving objects 205, and
- a meteorological link 206 or weather uplink as it is known.

The device according to the invention comprises means for determining parameters characterizing the aircraft detected 101 on the basis of data originating from the sensors for detecting surrounding aircraft. The sensors that may be used for the detection of surrounding aircraft are, for example: a TCAS, a radar, an Optronics sensor, an Infra-red sensor or a data link (for example ADS-B or link 16). These data make it possible to consider other aircraft detected in proximity to the aircraft, in the given time horizon (for example two minutes).

This module characterizes the dimensioning parameters of the detected aircraft by consolidating the data received from the various sensors.

The parameters characterizing a detected aircraft comprise: (i) a type of detected aircraft, (ii) a 3D reference position of the aircraft, (iii) a prediction of displacement of the aircraft in the form of a predicted 4D trajectory starting from the reference point and (iv) the consolidated detection means for formulating the reference position and the prediction of displacement of the aircraft, for example, a radar, a TCAS, an ADS-B collaboration, a data link received from the ground or a control aircraft (of link 16 type for example), optronic link, infra-red link.

The characterization makes it possible to estimate the type of aircraft in proximity and its forthcoming trajectory so as to be able to define the rules of the air, the margins and the priorities that are applicable.

Among the applicable rules, account may be taken of, for example:

- the relative priorities of the various aircraft, so as to determine which aircraft should perform a separation manoeuvre, from the highest priority (does not have to "move") to the lowest priority: balloon, glider, aeroplane,
- the manoeuvres to be favoured: for example, in an approach situation: a go-around; when cruising: a turn to the right to overtake on the right.

The types of aircraft envisaged include:

- Hot-air balloons, for example characterized by their thermal signature (IR) and their volume (optro);
- Gliders, for example characterized by their wingspan and their speed;
- Aeroplanes for general aviation and helicopters, for example characterized by their metallic signature (radar) and their speed (Doppler radar). A helicopter deploying at over 70 knots is no different from a general aviation aeroplane. Transport aeroplanes, for example characterized by their metallic signature (radar), their speed (Doppler radar) and their deployment altitude, in general higher except in proximity to airports;
- Fast military aircraft, for example essentially characterized by a speed of deployment/altitude pair that is incompatible with civilian operations (in tactical/segregated zones) or their proximity to a zone that is regulated/reserved for military operations in civilian aerial transport missions;

The knowledge of the type of aircraft is used to determine the necessary margins of manoeuvre and the priority rules to be applied. The types of trajectories envisaged include:

- Vector: the trajectory of the aircraft is known only through the speed vector giving a heading and a vertical tendency. This description arising from sensors of radar (or optronic) type which are able to formulate a detection and an estimation of the speed of the "target" measured, which is correlated with the knowledge of the deployment of the aircraft carrying the device according to the invention, makes it possible to estimate a 3D speed vector of each "target".
- Flight plan: the trajectory of the aircraft is known through the description of the scheduled lateral path. This description arises from collaborative information, such as the transmission of a few branches of the flight plan of the civilian aircraft by ADS-B for example.
- 3D: the trajectory of the aircraft is known at one and the same time laterally and vertically. This description arises from collaborative information, for example via the transmissions of flight data on "friendly" aircraft transmitted by a military control centre.

When several sources of information are available, it is possible to use selection rules defining which sources of information are used by priority. For example:

- Within the framework of a civilian mission, the information arising from collaborative systems (like the ADS-B) are used by priority;
- Within the framework of a military mission (discreet for example), the data transmitted by a command system are favoured;
- Within the framework of a civilian flight outside of controlled airspaces, the data collected by active systems aboard the aircraft, for example of radar or TCAS type, are favoured.

The device according to the invention comprises means for determining parameters characterizing the meteorological phenomena detected 102 on the basis of meteorological data originating from the weather sensors. By consolidating various sources of meteorology information, for example, a WXR radar and a weather data linkup, the type of phenomenon in proximity to the aircraft is estimated. The types of phenomenon detected include: zones of predictive windshears, turbulence zones, stormy or thundery zones, and volcanic eruption zones (or dust arising from eruptions).

Figure 3:
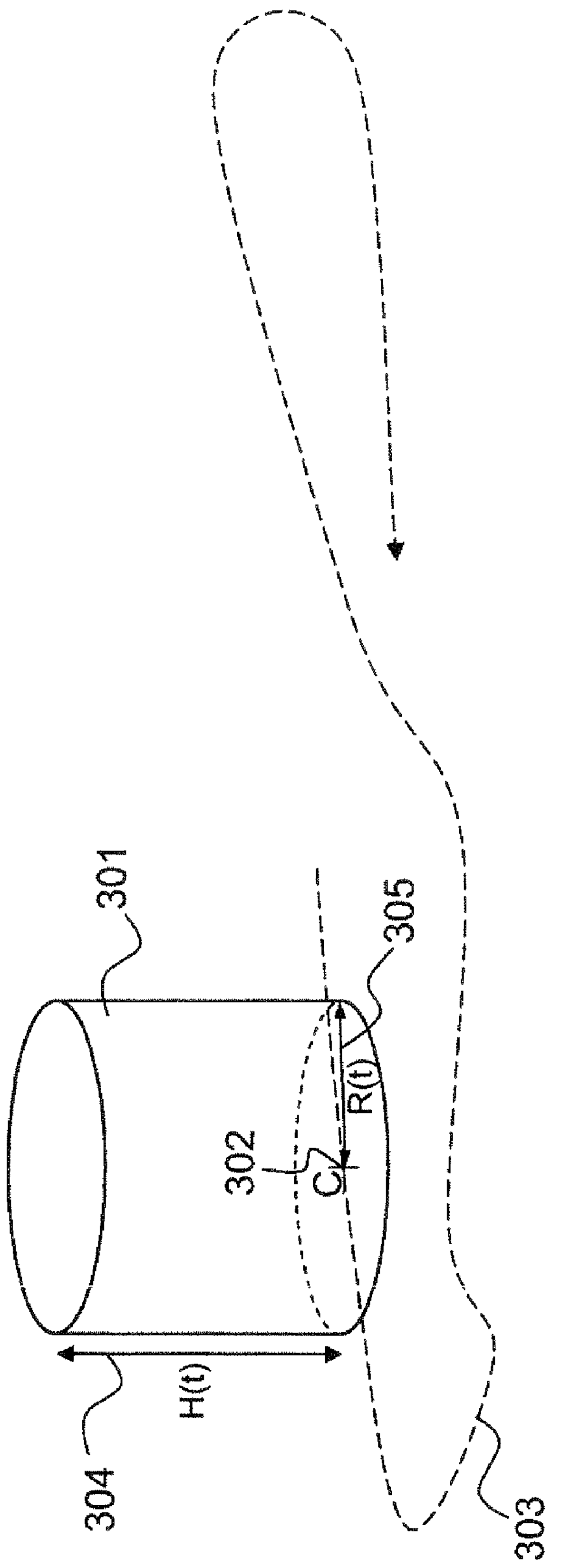
FIG. 3 represents an exemplary meteorological phenomenon characterized by parameters.

The type of phenomenon makes it possible to define the rules of the air and the margins that are applicable. The meteorological phenomena are also defined by the following parameters illustrated in FIG. 3:

- A volume 301 and a reference point 302, for example, in the form of a cylinder,
- A predicted 4D trajectory 3D and time—of the reference point, for example, the trajectory 303 the centre of the base disc of the cylinder C(t), in three dimensions, altitude, latitude and longitude and as a function of time,
- Laws of temporal evolution of the reference volume, for example, the evolution of the dimensions of the base cylinder over time with R(t) as radius 304 and H(t) as height 305, where t is the time.

The volume parameter can be any three-dimensional volume (polyhedron, sphere, etc.). The laws of temporal evolution of the volume are then based, for example, on the vertices of the polyhedron.

The device according to the invention comprises means for calculating prohibited zones and their evolution over time 103 on the basis of the parameters characterizing the aircraft and the meteorological phenomena detected. As a function of the type of aircraft or of weather phenomenon detected, it is possible to calculate lateral margins, vertical margins, an estimation of the discrepancy, an increase of the margins as a function of time and of the confidence in the measurement and the speed/direction estimate.

Figure 4:
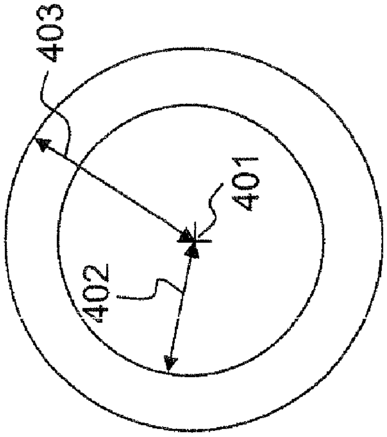
FIG. 4 illustrates a prohibited zone associated with an aircraft of glider type.

FIG. 4 illustrates a prohibited zone associated with an aircraft of glider type. The prohibited zone of a moving object whose speed vector alone is known and whose speed vector is not known is defined by a succession of concentric circles whose radii 402, 403 obey a time-dependent increasing law and whose centre is the position 401 of the said moving object. The trajectory associated with a glider not being predictable, the calculated prohibited zone forms a circle whose radius increases over time. This safe volume is defined by a sampling. Samples i are effected with a given timestep of p, for example p=10 seconds. The prohibited volume is represented by a zone of restriction of $r_i$ seconds around the initial position of the glider 401. The $r_i$ are increasing, for example $r_1$=5 seconds and $r_2$=10 seconds and form concentric circles.

Figure 5:
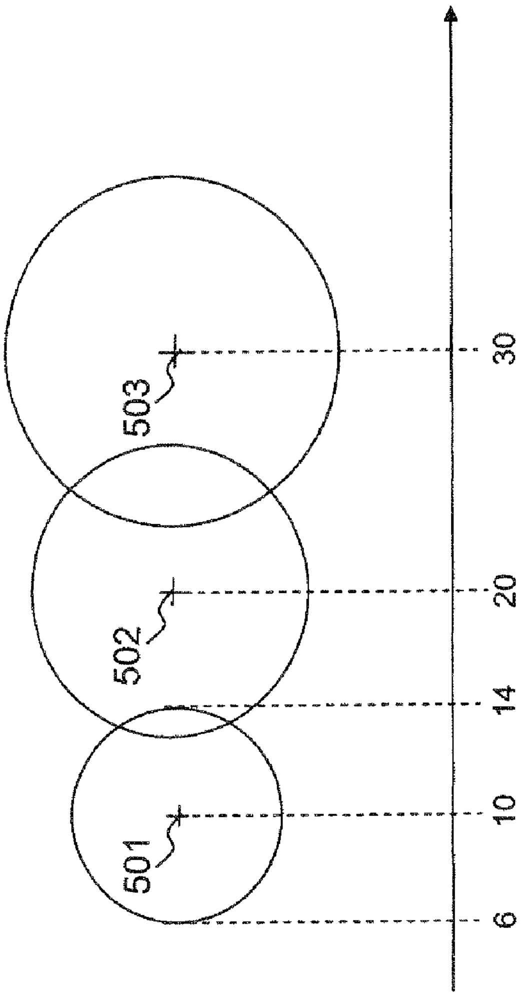
FIG. 5 illustrates a prohibited zone associated with a moving object of transport aeroplane type characterized by a speed vector.

FIG. 5 illustrates a prohibited zone associated with an aircraft of transport aeroplane type whose speed vector is known. This prohibited volume is defined by a sampling. Samples i are effected with a given timestep of p, for example p=10 seconds. The safe volume is represented by ozone of restriction of $r_i$ seconds. The radii of the restriction zones comply with the following formula: with $r_i+r_{i+1}>p$. Thus, the restriction zones partially overlap, while simplifying the sampling and limiting the requirements in terms of calculation resources.

The table below represents the list of samples and the dates at which the corresponding zone is prohibited for use by aircraft carrying a device according to the invention.

| Sample | Date of sample | Date of start of restriction | Date of end of restriction |
|---|---|---|---|
| 1 | 10 s | 6 s | 14 s |
| 2 | 20 s | 15 s | 25 s |
| 3 | 30 s | 24 s | 36 s |

FIG. 5, corresponding to the above array, illustrates the restriction zone at three different dates. The three samples are effected at 10-second intervals. The centre of this zone is the predicted position of a detected aircraft as calculated with the speed vector of the said aircraft. A first point 501 represents the position of the aircraft at a date of 10 seconds. A second 502 and a third point 503 represent respectively the position of the aircraft at a date of 20 seconds and at a date of 30 seconds.

Figure 6:
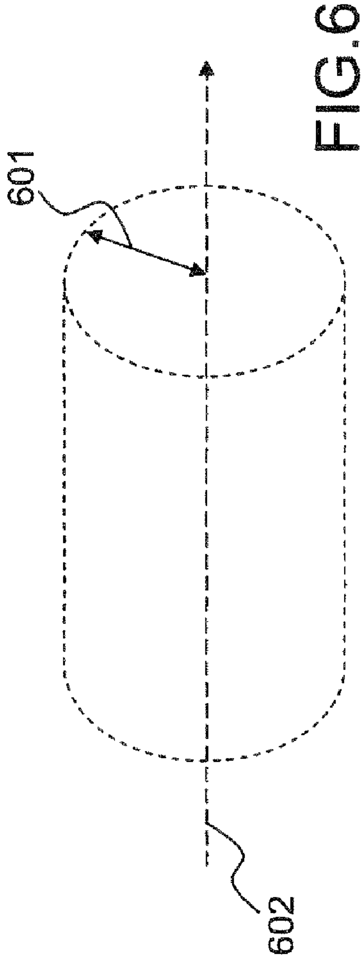
FIG. 6 illustrates a prohibited zone associated with an aircraft characterized by a trajectory.

FIG. 6 illustrates a prohibited zone associated with an aircraft whose trajectory is known. For an aircraft whose 3D trajectory is known, the prohibited zone is defined, for example, by: a tube enveloping a scheduled flight plan on the horizontal plane 601 having a radius corresponding to a measurement 602 of the variation of the parameters over a given period, for example 15 seconds. The principle is to estimate the maximum discrepancy measured with respect to the flight plan in the recent past, for example a minute. The discrepancy is measured laterally and vertically. A certain percentage, for example 95%, of the measured maximum is kept.

The prohibited zone can also be defined by a rectangular parallelepiped, corresponding to a corridor around the horizontal trajectory and a fixed height margin around the vertical description of the 3D part. A rectangular parallelepiped makes it possible to estimate the lateral and vertical discrepancies independently, according to the same principle.

The device according to the invention comprises means for calculating zones, in four dimensions, reachable by the aircraft 104 on the basis of the position of the aircraft, of data describing regulated zones prohibited to navigation, of a digital terrain model, of a list of obstacles and prohibited zones calculated. Patent application FR 2 910 640 already discloses a method of estimating, for a moving object subject to constraints relating to vertical trajectory profile and decreasing of risks, the distances of the points of a map obtained by projection on a horizontal plane of a 3D representation of a deployment space by a mesh of elementary cubes that are associated with danger levels and are labelled by an altitude, a latitude and a longitude. However, this method takes no account of dynamic meteorological phenomena and moving objects whose position evolves over time.

The means for calculating zones reachable in four dimensions according to the invention verifies, at each propagation timestep, in addition to the criteria described in the aforesaid application, whether, for a given 3D position and a considered date t, the aircraft is more than a certain distance (horizontal separation and vertical separation) from a moving object or from a meteorological phenomenon predicted at the date t. The timestep in the sampling of the moving objects and meteorological phenomena is expanded as a function of the separation margins. For example, the moving objects and the meteorological phenomena are predicted with timesteps of 15 seconds.

The method described in patent application FR 2 910 640 implements a distance transform operating by propagation on a 2D image of the map whose pixels arranged in rows and columns in order of longitude and latitude values correspond to the columns of elementary cubes of the mesh of the representation of the deployment space and label, for each column, prohibited altitude slices corresponding to the cubes associated with danger levels greater than a value admissible for them to be crossed. This distance transform estimates the distances of the various points of the image with respect to a source point placed in proximity to the moving object by applying, by scanning, a chamfer mask to the various points of the image. The distance estimation for a point, by applying the chamfer mask to this point termed the aim point, is performed by cataloguing the various paths going from the aim point to the source point and passing through points of the neighbourhood of the aim point which are overlapped by the chamfer mask and whose distances from the source point have been previously estimated in the course of the same scan, by determining the lengths of the various paths catalogued by summing the distance assigned to the waypoint of the neighbourhood and its distance from the aim point as extracted from the chamfer mask, by searching for the shortest path from among the catalogued paths and by adopting its length as estimation of the distance from the aim point. Initially, at the start of the scan, a distance value greater than the largest distance measurable on the image is allotted to all the points of the image except to the source point, the origin of the distance measurements, to which a zero distance value is assigned. The lengths of the catalogued paths, when applying the chamfer mask to an aim point, with a view to searching for the shortest path, are translated into travel times for the moving object and the catalogued paths, whose travel times for the moving object are such that it would reach the aim point in an elementary cube of the representation of the deployment space whose danger level is greater than an admissible value, are excluded from the search for the shortest path.

It is recalled that the distance between two points of an area is the minimum length of all the possible journeys on the area, starting from one of the points and finishing at the other. In an image formed of pixels distributed according to a regular mesh of rows, columns and diagonals, a propagation-based distance transform estimates the distance of a pixel termed the "aim" pixel with respect to a pixel termed the "source" pixel by progressively constructing, starting from the source pixel, the shortest possible path following the mesh of pixels and finishing at the aim pixel, aided by the distances found for the image pixels already analysed and by an array termed the chamfer mask cataloguing the values of the distances between a pixel and its close neighbours.

Figure 7:
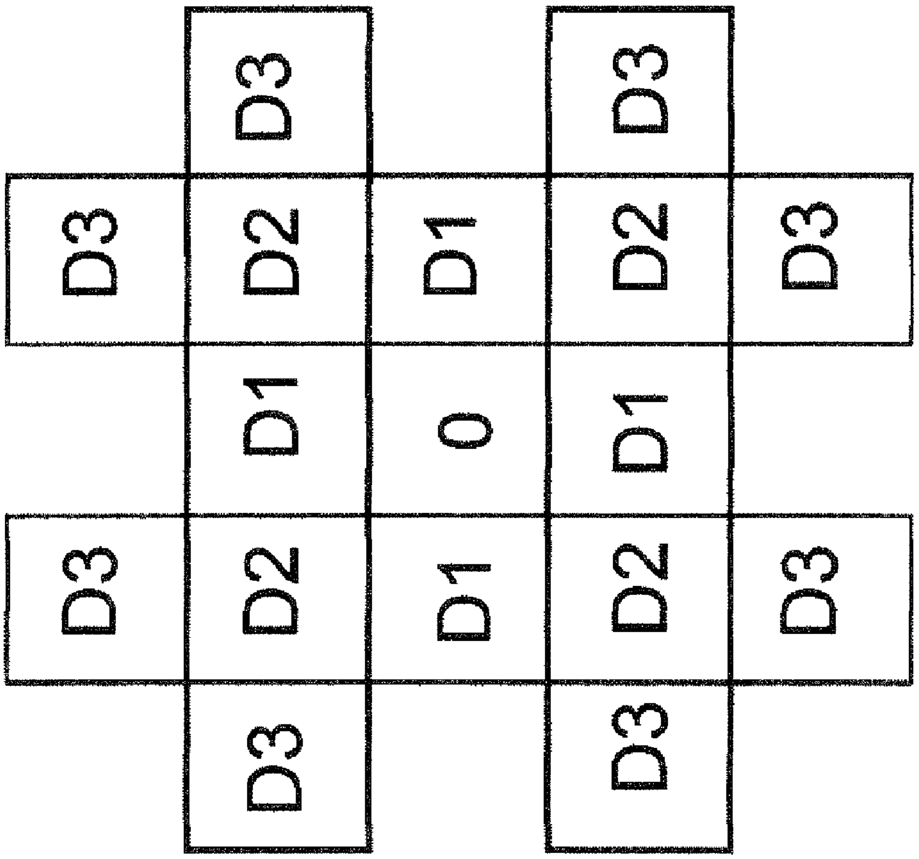
FIG. 7 represents an exemplary chamfer mask.

As shown in FIG. 7, a chamfer mask takes the form of an array with an arrangement of boxes reproducing the pattern of a pixel surrounded by its close neighbours. At the centre of the pattern, a box assigned the value 0 labels the pixel taken as origin of the distances catalogued in the array. Around this central box are clustered peripheral boxes filled with nonzero distance values and mimicking the arrangement of the pixels of the neighbourhood of a pixel assumed to occupy the central box. The distance value appearing in a peripheral box is that of the distance separating a pixel occupying the position of the peripheral box concerned from a pixel occupying the position of the central box. It is noted that the distance values are distributed as concentric circles. A first circle of four boxes corresponding to the four pixels that are closest to the pixel of the central box and placed either on the row or on the column of the pixel of the central box are assigned a distance value D1. A second circle of four boxes corresponding to the four pixels that are closest to the pixel of the central box and placed off the row and off the column of the pixel of the central box are assigned a distance value D2. A third circle of eight boxes corresponding to the eight pixels that are closest to the pixel of the central box and placed off the row, off the column and off the diagonals of the pixel of the central box are assigned a value D3.

The chamfer mask can cover a more or less extended neighbourhood of the pixel of the central box by cataloguing the values of the distances of a greater or lesser number of concentric circles of pixels of the neighbourhood. It can be reduced to the first two circles formed by the pixels of the neighbourhood of a pixel occupying the central box or be extended beyond the first three circles formed by the pixels of the neighbourhood of the pixel of the central box but it is usual to stop at three first circles as is the case of the chamfer mask represented in FIG. 7. The values of the distances D1, D2, D3 which correspond to Euclidean distances are expressed in a scale permitting the use of integers at the cost of a certain approximation. Thus, G. Borgefors gives the value 5 to the distance D1 corresponding to an echelon with abscissa x or with ordinate y, the value 7, which is an approximation of $5\sqrt{2}$, to the distance D2 corresponding to the root of the sum of the squares of the echelons with abscissa and ordinate $\sqrt{x^2+y^2}$, and the value 11, which is an approximation of $5\sqrt{5}$, to the distance D3.

The progressive construction of the shortest possible path going to an aim pixel, starting from a source pixel and following the mesh of pixels, is done by regular scanning of the pixels of the image by means of the chamfer mask. Initially, the pixels of the image are assigned an infinite distance value, in fact a number sufficiently high to exceed all the values of the measurable distances in the image, with the exception of the source pixel which is assigned a zero distance value. Then the initial distance values assigned to the aim points are updated in the course of the scanning of the image by the chamfer mask, an update consisting in replacing a distance value allotted to an aim point with anew lesser value resulting from a distance estimation made on the occasion of a new application of the chamfer mask to the aim point considered.

A distance estimation by applying the chamfer mask to an aim pixel consists in cataloguing all the paths going from this aim pixel to the source pixel and passing through a pixel of the neighbourhood of the aim pixel whose distance has already been estimated in the course of the same scan, in searching, from among the catalogued paths, for the shortest path or paths and in adopting the length of the shortest path or paths as distance estimation. This is done by placing the aim pixel whose distance it is desired to estimate in the central box of the chamfer mask, by selecting the peripheral boxes of the chamfer mask corresponding to pixels of the neighbourhood whose distance has just been updated, by calculating the lengths of the shortest paths linking the pixel to be updated to the source pixel while passing through one of the selected pixels of the neighbourhood, by addition of the distance value assigned to the pixel of the neighbourhood concerned and of the distance value given by the chamfer mask, and in adopting, as distance estimation, the minimum of the path length values obtained and of the former distance value assigned to the pixel undergoing analysis.

The order of scanning of the pixels of the image influences the reliability of the distance estimations and of their updates since the paths taken into account depend thereon. In fact, it is subject to a regularity constraint which implies that if the pixels of the image are labelled in lexicographic order (pixels ranked in row-by-row ascending order starting from the top of the image and progressing towards the bottom of the image, and from left to right within a row), and if a pixel p has been analysed before a pixel q then a pixel p+x must be analysed before the pixel q+x. The lexicographic order, inverse lexicographic order (scanning of the pixels of the image row-by-row from bottom to top and, within a row, from right to left), transposed lexicographic order (scanning of the pixels of the image column-by-column from left to right and, within a column, from top to bottom), inverse transposed lexicographic order (scanning of the pixels by columns from right to left and within a column from bottom to top) satisfy this regularity condition and more generally all scans in which the rows and columns are scanned from right to left or from left to right. G. Borgefors advocates a double scan of the pixels of the image, once in lexicographic order and another time in inverse lexicographic order.

Figure 8B:
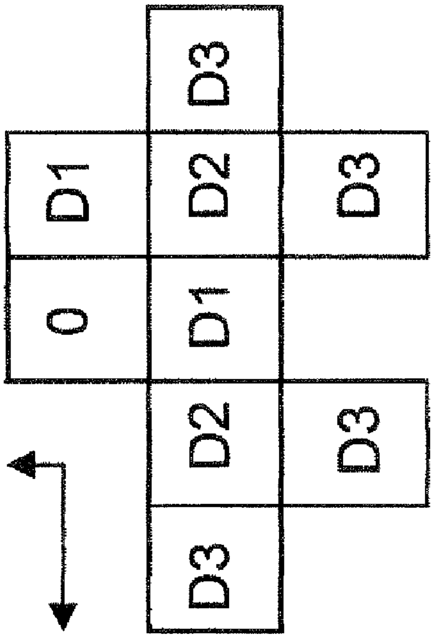
FIGS. 8*a* and 8*b* show the cells of the chamfer mask illustrated in FIG. 7, which are used in a scan pass in lexicographic order and in a scan pass in inverse lexicographic order.
Figure 8A:
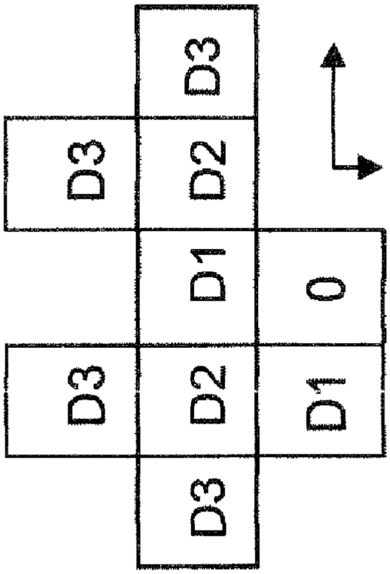

FIG. 8*a* shows, in the case of a scan pass in lexicographic order going from the upper left corner to the lower right corner of the image, the boxes of the chamfer mask of FIG. 7 that are used to catalogue the paths going from an aim pixel placed under the central box (box indexed by 0) to the source pixel, passing through a pixel of the neighbourhood whose distance has already formed the subject of an estimate in the course of the same scan. These boxes are eight in number, arranged in the upper left part of the chamfer mask. There are therefore eight paths catalogued for the search for the shortest whose length is taken as estimate of the distance.

FIG. 8*b* shows, in the case of a scan pass in inverse lexicographic order going from the lower right corner to the upper left corner of the image, the boxes of the chamfer mask of FIG. 7 that are used to catalogue the paths going from an aim pixel placed under the central box (box indexed by 0) to the source pixel, passing through a pixel of the neighbourhood whose distance has already formed the subject of an estimate in the course of the same scan. These boxes are complementary to those of FIG. 8*a*. They are also eight in number but arranged in the lower right part of the chamfer mask. There are therefore again eight paths catalogued for the search for the shortest whose length is taken as estimate of the distance.

The propagation-based distance transform, the principle of which has just been briefly recalled, was designed at the outset for analysing the positioning of objects in an image but it was soon applied to the estimation of the distances on a relief map extracted from a regular-mesh terrain elevation database of the terrestrial area. Indeed, such a map is not explicitly furnished with a metric since it is drawn on the basis of the altitudes of the points of the mesh of the terrain elevation database for the zone represented. Within this framework, the propagation-based distance transform is applied to an image whose pixels are the elements of the elevation database for the terrain belonging to the map, that is to say, altitude values associated with the latitude, longitude geographical coordinates of the nodes of the mesh where they have been measured, ranked, as on the map, by increasing or decreasing latitude and longitude according to a two-dimensional array of latitude and longitude coordinates.

In the case of an aircraft, the evolution of the uncrossable zones as a function of the vertical profile imposed on the trajectory of the aircraft is taken into account by means of the foreseeable altitude of the aircraft at each aim point whose distance is undergoing estimation. This foreseeable altitude, which very obviously depends on the path followed, is that of the aircraft after following the path adopted for the distance measurement. The estimation of this foreseeable altitude of the aircraft at an aim point is done by propagation in the course of the scan of the image by the chamfer mask in a manner analogous to the distance estimation. For each catalogued path going from an aim point to the source point while passing through a point of the neighbourhood of the aim point for which the distance from the source point and the foreseeable altitude of the aircraft have already been estimated in the course of the same scan, the foreseeable altitude of the aircraft is deduced from the length of the path and the vertical profile imposed on the trajectory of the aircraft. This foreseeable altitude, estimated for each catalogued path going from an aim point whose distance is undergoing estimation to a source point placed in proximity to the position of the aircraft, is used as a criterion for selecting the paths taken into account in the distance estimation. If it corresponds, having regard to a safety margin, to an elementary cube for representing the airspace whose danger level is above the threshold required for the flight, that is to say to an altitude slice which is prohibited because in the relief or in a meteorological disturbance, the catalogued path with which it is associated is discarded and does not participate in the selection of the shortest path. Once the selection of the shortest path has been performed, its length is taken as distance from the aim point and the foreseeable altitude for the aircraft associated with it is also retained for the altitude of the aircraft at the aim point.

The following is available: on the one hand, a profile exhibiting the altitude as a function of distance from the origin. It is used to estimate the altitude that the aircraft can have as a function of the propagated distance that is evaluated on the grid. On the other hand, a profile exhibiting the date as a function of distance from the origin is available. This profile is obtained, for example, by integrating the speed scheduled by the flight management system along the flight plan or by making speed assumptions (constant, for example). Therefore, on the basis of the propagated distance that is estimated, it is possible to deduce therefrom the date at which one ought to be at this distance.

Figure 9:
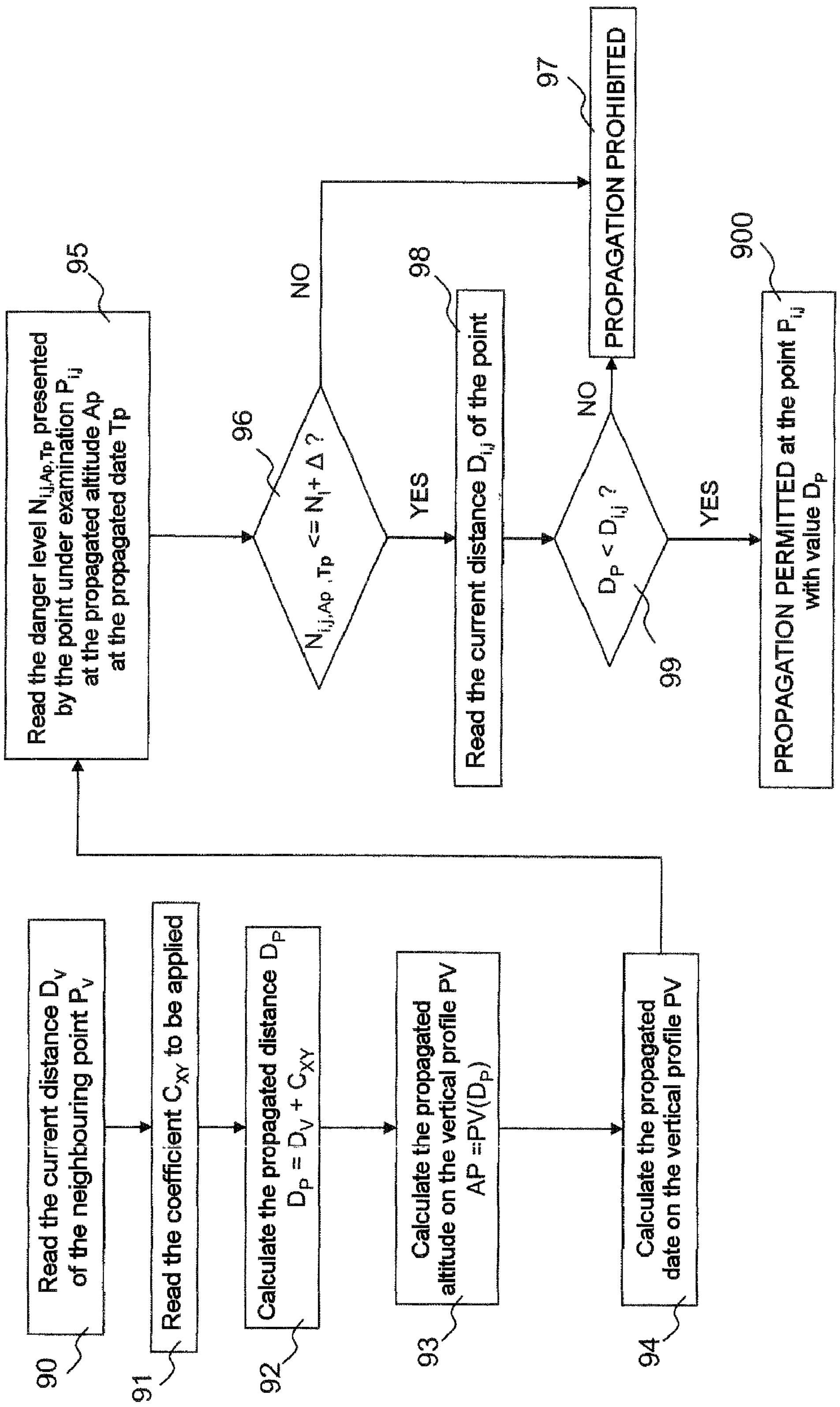
FIG. 9 illustrates the main steps of a processing performed so as to determine the zones reachable by the aircraft while taking account of constraints.

FIG. 9 illustrates the main steps of the processing performed when applying the chamfer mask to an aim point $P_{i,j}$ so as to estimate its distance for an aircraft having an imposed vertical trajectory profile. The aim point considered $P_{i,j}$ is placed in the central box of the chamfer mask. For each neighbouring point $P_V$ which enters the boxes of the chamfer mask and whose distance has already been estimated in the course of the same scan, the processing consists in:

- reading the estimated distance $D_V$ of the neighbouring point $P_V$ (step 90),
- reading the coefficient $C_{XY}$ of the chamfer mask corresponding to the box occupied by the neighbouring point $P_V$ (step 91),
- calculating the propagated distance $D_P$ corresponding to the sum of the estimated distance $D_V$ of the neighbouring point $P_V$ and of the coefficient $C_{XY}$ assigned to that box of the chamfer mask occupied by the neighbouring point $P_V$.

$$D_P=D_V+C_{XY} \quad \text{(step 92)},$$

- calculating the foreseeable altitude $A_P$ of the aircraft after crossing the distance $D_P$ directly on the basis of the distance $D_P$ if the vertical profile imposed on the trajectory of the aircraft is defined as a function of the distance traveled $PV(D_P)$ and implicitly takes into account the travel time or indirectly by way of the travel time if the vertical profile imposed on the trajectory of the aircraft is defined by a rate of change of altitude (step 93),
- calculating the foreseeable date Tp at the position after crossing the distance $D_P$ (step 94),
- reading the foreseeable danger level $N_{i,j,Ap,Tp}$ of the aim point $P_{i,j}$ in the representation as elementary cubes of the airspace at the foreseeable altitude $A_P$ and at date Tp (step 95),
- comparing the foreseeable danger level $N_{i,j,Ap,Tp}$ with a permitted limit value $N_1$ for the flight, increased by a safety margin Δ (step 96),
- eliminating the propagated distance $D_P$ if the foreseeable danger level $N_{i,j,Ap,Tp}$ is greater than that admissible for the flight increased by the safety margin Δ (step 97),
- if the foreseeable danger level $N_{i,j,Ap,Tp}$ increased by the safety margin Δ is below the limit $N_1$ fixed for the flight, reading the distance $D_{i,j}$ already assigned to the aim point considered $P_{i,j}$ (step 98) and comparing it with the propagated distance $D_P$(step 99),
- eliminating the propagated distance $D_P$ if it is greater than or equal to the distance $D_{i,j}$ already assigned to the aim point considered $P_{i,j}$, and
- replacing the distance $D_{i,j}$ already assigned to the aim point considered $P_{i,j}$ by the propagated distance $D_P$ if the latter is smaller (step 900),
- the elementary cubes exhibiting a smaller distance than the largest distance measurable on the image at the end of the scan being designated reachable zones.

The complete scan of the image is similar to that described in the aforesaid patent application.

A retained joining point is a point of the initial flight plan which remains reachable despite the multiple constraints of the aircraft and of the surrounding meteorological phenomena. Moreover, a flight plan must exist which makes it possible to meet up with this point and is compatible with the fuel resources available.

Figure 10:
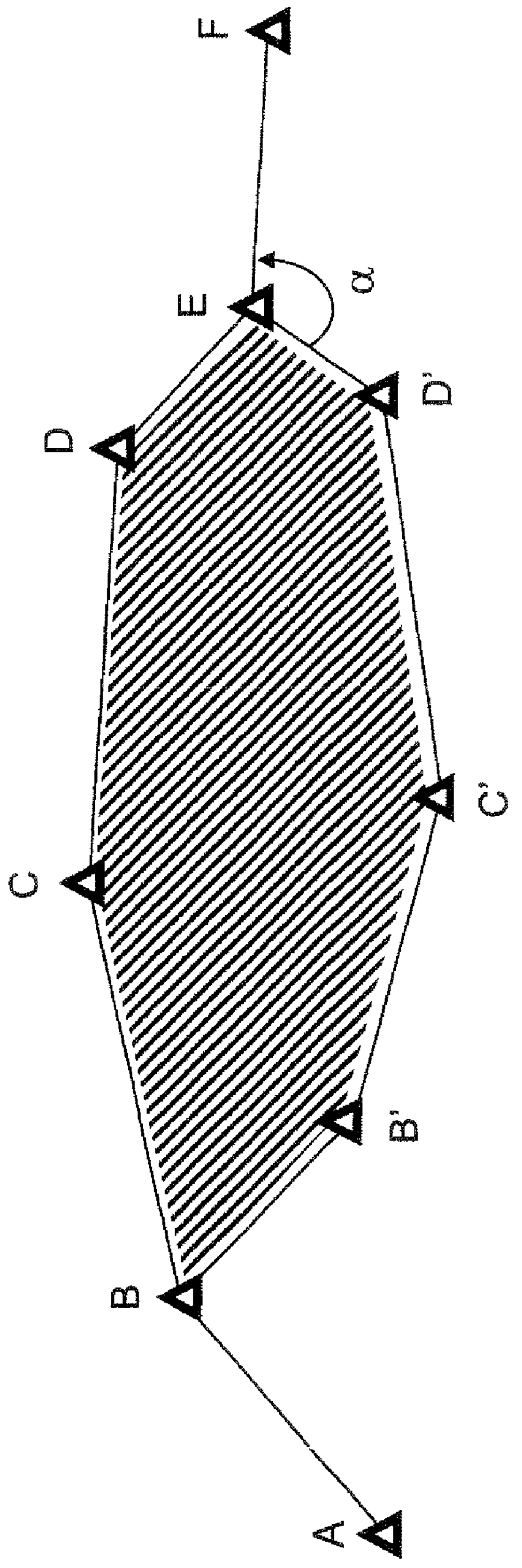
FIG. 10 illustrates an initial trajectory and a joining trajectory.

A point optimizing a quality criterion is chosen from among the joining points retained. The example of an initial trajectory represented in FIG. 10 and of a joining trajectory is taken so as to illustrate these quality criteria. The initial trajectory is formed by the points A, B, C, D, E and F. The joining trajectory is formed by the points B', C', D' and E.

A first quality criterion is the maximization of the number of preserved waypoints of the initial flight plan. The joining trajectory of the example preserves three points of the initial trajectory: A, E and F.

A second quality criterion is the minimization of the total turning amount equal to the sum in absolute value of all the changes of heading.

A third quality criterion relates to a measurement of the ratio between the initial trajectory and the new evaluated trajectory. A joining flight plan being all the better the closer its length is to that of the initial flight plan.

A fourth quality criterion is the minimization of the angle of joining of the initial flight plan. This is the angle formed by the joining trajectory and the initial trajectory at the joining point. In the example, this is the angle a between the flight segment D'E and the segment EF.

A fifth quality criterion is the minimization of the area of discrepancy with respect to the initial flight plan. The discrepancy area is defined by its perimeter composed of the initial trajectory and of the joining trajectory. In the example, this is the area of the polygon B, C, D, E, D',C',B'.

It is also possible to choose a point optimizing a weighted combination of several of the preceding criteria. The criteria can be combined according to the following formula:

$$C = \left[ \left( \prod_{i=1}^{n} (1 + C_i)^{\alpha_i} \right)^{\frac{1}{\sum_{i=1}^{n} \alpha_i}} - 1 \right]$$

where Ci is the score of criterion i (i=1 to 5) and $\alpha_1$ is the "power" allotted—by configuration—to criterion i. By assigning a higher power, the influence of the criterion is increased.

According to the application to which the invention is addressed, the powers can be adjusted differently. For example, a military application will try to limit the number of deleted points and the area between the two trajectories. For example, an application in respect of a medical helicopter will try to limit the discrepancy in distance between the trajectories, even if the waypoints differ.

Each of the criteria presented above must be normalized so as to be able to be in the above formula. FIGS. 11*a* to 11*e* show examples of curves making it possible to normalize the various quality criteria presented. These curves make it possible to associate with each value of a criterion a score, lying between 0 and 1, reflecting its quality, 0 being the worst score and 1 the best.

Figure 11A:
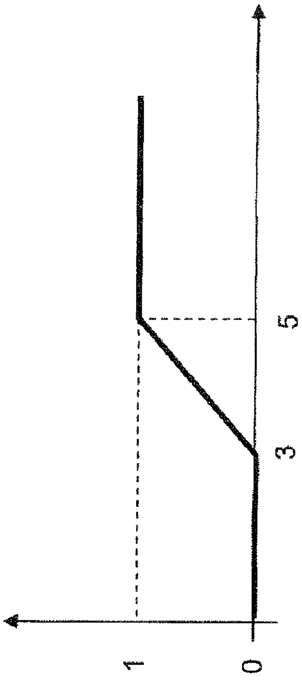
FIG. 11*a* shows an example of scores allotted to a joining flight plan as a function of the number of waypoints preserved with respect to an initial flight plan.

FIG. 11*a* shows an example of the scores allotted to a joining flight plan as a function of the number of waypoints preserved with respect to an initial flight plan. Between 0 and 3 preserved points the score is zero, for 4 preserved points the score is 0.5. Beyond 5 preserved points the score is 1.

Figure 11B:
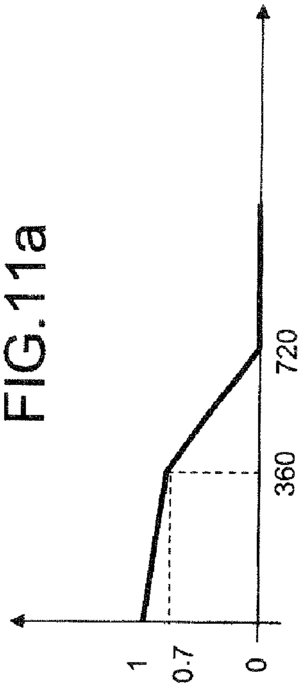
FIG. 11*b* shows an example of scores allotted to a joining flight plan as a function of a total turning amount with respect to the initial flight plan.

FIG. 11*b* shows an example of the scores allotted to a joining flight plan as a function of its total turning amount. The score is from 1 to 0 degrees. Between 0 and 360 degrees the score decreases linearly. The score is 0 beyond 720 degrees. Between 360 and 720 degrees, the score decreases linearly.

Figure 11C:
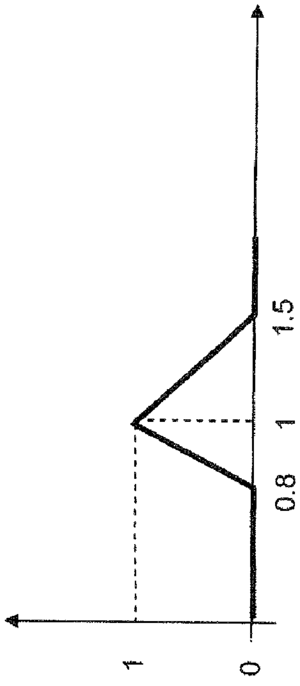
FIG. 11*c* shows an example of scores allotted to a joining flight plan as a function of the ratio between the length of the initial trajectory and its length.

FIG. 11*c* shows an example of the scores allotted to a joining flight plan as a function of the ratio between the length of the initial trajectory and its length. Between 0 and 0.8 the score is zero. Between 0.8 and 1 the score increases linearly. For 1 the score is 1. Beyond 1.5 the score is zero. Between 1 and 1.5 the score decreases linearly.

Figure 11D:
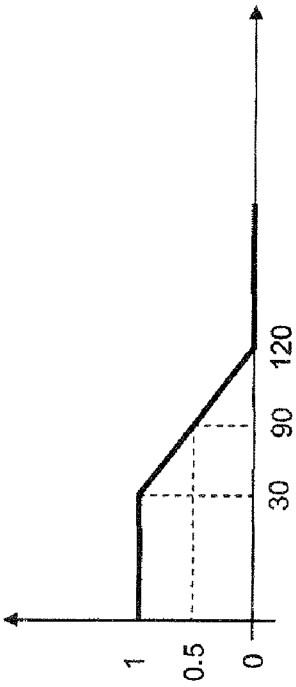
FIG. 11*d* shows an example of scores allotted to a joining flight plan as a function of the flight plan joining angle.

FIG. 11*d* shows an example of the scores allotted to a joining flight plan as a function of the flight plan joining angle. Between 0 and 30 degrees the score is 1. Beyond 120 degrees the score is 0. Between 30 and 120 degrees the score decreases linearly.

Figure 11E:
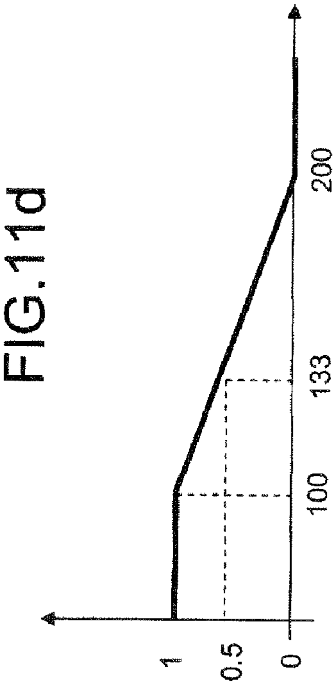
FIG. 11*e* shows an example of scores allotted to a joining flight plan as a function of the area of discrepancy with respect to the initial flight plan.

FIG. 11*e* shows an example of the scores allotted to a joining flight plan as a function of the area of discrepancy with respect to the initial flight plan. From among all the candidates, the smallest is taken as reference. The others are expressed as a percentage of this reference area. At 100% the score is 1. Beyond 200% the score is 0. Between 100% and 200% the score decreases linearly.

Out of the five criteria cited above, there are two criteria which are dependent solely on the joining point, and therefore independent of a reference trajectory, and three criteria which are dependent on a comparison between the initial trajectory and the joining trajectory.

To calculate a weighted combination of several of the above criteria, it is possible to evaluate first the criteria not requiring any reference trajectory. Thereafter, a certain number of points (for example three) are preserved which are the best ranked according to the formula already described applied to the evaluated criteria. Then, for each of the points retained, the corresponding joining trajectory can be calculated. For each of the joining trajectories calculated, the criteria are evaluated using the initial trajectory and the evaluated trajectory. Ultimately, the joining point best evaluated as a function of the combination of the five criteria is preserved.

The device according to the invention comprises means for calculating a joining flight plan for meeting up with the selected joining point 106. This calculation step is based on a method described in French patent 2 894 367 formulating the map of "return" distance from the selected destination position.

The determination of a flight plan leading from the current position of the aircraft to the selected joining point while complying with flight constraints comprises the following steps:

- the formulation of two maps of distances covering a deployment zone containing the departure and destination points and enclosing the same set of obstacles to be circumvented taking into account the relief, the regulated-overflight zones and the flight and speed vertical profiles imposed on departure and/or on arrival, the first having the departure point as origin of the distance measurements and the second, the destination point as origin of the distance measurements,
- the formulation of a third map of distances by summing, for each of its points, the distances which are assigned to them in the first and second distance maps,
- the labelling, in the third distance map, of a connected set of iso-distance points forming a string of parallelograms and/or points linking the departure and destination points,
- the selection, in the labelled connected set of iso-distance points, of a series of consecutive points going from the departure point to the destination point while passing through diagonals of its parallelograms, the said series being termed the direct path,
- the approximation of the series of points of the direct path by a chain of straight segments complying with an arbitrary threshold of maximum separation with respect to the points of the series and an arbitrary threshold of minimum lateral separation with respect to the set of obstacles to be circumvented, and
- the choice of the points of the intermediate junctions of the straight segments in the guise of waypoints or turning points of the flight plan.

The calculation of a joining flight plan described above can be repeated at regular intervals. The aircraft's current flight plan is not for that matter updated at each iteration of the calculation. The current flight plan is preserved as long as, on the one hand, it remains valid and, on the other hand, as long as gain in the quality criterion for the new flight plan calculated with respect to the current flight plan is below a given threshold.

What is claimed is:

1. Device for calculating a flight plan of an aircraft, the flight plan making it possible to meet up with an initial flight plan, the aircraft comprising sensors for detecting surrounding moving objects and weather sensors for detecting meteorological phenomena, the device comprising means for:

a. determining parameters of the moving objects detected on the basis of data originating from the sensors for detecting surrounding moving objects;

b. determining parameters of the meteorological phenomena detected on the basis of meteorological data originating from the weather sensors;

c. calculating prohibited zones and their evolution over time on the basis of the parameters characterizing the moving objects and the meteorological phenomena detected, the prohibited zones defining a space where the aircraft cannot fly;

d. calculating zones reachable by the aircraft and their evolution over time on the basis of:

i. a position of the aircraft;

ii. data describing regulated zones prohibited to navigation;

iii. a digital terrain model; and iv. a list of obstacles and prohibited zones calculated;

e. selecting a joining point meeting up with the initial flight plan situated in a reachable zone; and f. calculating a joining flight plan for meeting up with the selected joining point.

2. Device according to claim 1, wherein the calculation of the joining flight plan is iterated at regular intervals, a flight plan being evaluated as a function of a quality criterion and in that a joining flight plan calculated at a given iteration, termed the new flight plan, becomes the flight plan followed by the aircraft if a joining flight plan, calculated at a previous iteration and followed by the aircraft, termed the current flight plan, exhibits an evaluation, within the sense of the quality criterion, for which the difference with the evaluation of the new calculated flight plan is above a given threshold.

3. Device according to claim 1, wherein the calculation of reachable zones comprises an estimation of the distances of the points in a map obtained by projection on a horizontal plane of a 3D representation of a deployment space by a mesh of elementary cubes that are associated with danger levels and are labeled by an altitude, a latitude, a longitude and a date, the estimation consisting in applying a distance transform to the cubes associated with danger levels greater than an admissible value N.sub.l labeling the zones prohibited for the aircraft; the distance transform estimating the distances of the various points of the projection with respect to a source point representing the position of the aircraft by applying, by scanning, a mask to the various points of the projection; a determined initial distance value being assigned, at the start of the scan, to all the points of the projection except to the source point, the origin of the distance measurements, to which a zero distance value is assigned.

4. Device according to claim 3, wherein the estimation of distance from the source point to a point considered P.sub.i,j, termed the aim point, being placed in a determined box of the mask, consists for each neighboring point P.sub.V entering the boxes of the mask and whose distance having already been estimated in the course of the same scan in:

a. reading the estimated distance D.sub.V of the neighboring point P.sub.V;

b. reading a coefficient C.sub.XY of the mask corresponding to the box occupied by the neighboring point P.sub.V;

c. calculating a propagated distance D.sub.P corresponding to the sum of the estimated distance D.sub.V of the neighboring point P.sub.V and of the coefficient C.sub.XY assigned to that box of the mask occupied by the neighboring point P.sub.V: D.sub.P=D.sub.V+C.sub.XY;

d. calculating a foreseeable altitude A.sub.P of the aircraft after crossing the distance D.sub.P;

e. calculating a propagated date Tp at the position after crossing the distance D.sub.P;

f. reading a foreseeable danger level N.sub.i,j,Ap,Tp of the aim point P.sub.i,j in the representation as elementary cubes of the airspace at the foreseeable altitude A.sub.P and at propagated date Tp;

g. comparing the foreseeable danger level N.sub.i,j,Ap,Tp with a permitted limit value N.sub.l for the flight, increased by a safety margin .DELTA.;

h. eliminating the propagated distance D.sub.P if the foreseeable danger level N.sub.i,j,Ap,Tp is greater than that admissible limit N.sub.l for the flight increased by the safety margin .DELTA.;

i. if the foreseeable danger level N.sub.i,j,Ap,Tp increased by the safety margin .DELTA. is below the limit N.sub.l fixed for the flight;

i. reading the distance D.sub.i,j already assigned to the aim point considered P.sub.i,j and comparing it with the propagated distance D.sub.P, ii. eliminating the propagated distance D.sub.P if it is greater than or equal to the distance D.sub.i,j already assigned to the aim point considered P.sub.i,j, and replacing the distance D.sub.i,j already assigned to the aim point considered P.sub.i,j by the propagated distance D.sub.P if the latter is smaller the elementary cubes exhibiting a smaller distance than the largest distance measurable on the image at the end of the scan being designated reachable zones.

5. Device according to claim 1, wherein the selection of the joining point comprises the calculation of a score C for points of the initial flight plan situated in the reachable zone, the point for joining the initial flight plan being that obtaining the best score C, the score being calculated according to the following relation: C=[(i=1n(1+Ci).alpha.i)1i)1n.alpha.i−1] ##EQU00003## where Ci is a score allotted according to an evaluation criterion i, and .alpha.sub.i is a value associated with the evaluation criterion i and reflecting its importance, i being a value lying between 1 and 5.

6. Device according to claim 1, wherein the parameters of the detected moving objects comprise at least one of the following characteristics: speed, position, and a future flight plan.

7. Device according to claim 6, wherein the prohibited zone associated with a moving object characterized solely by its position is defined by a succession of concentric circles with radii obeying a time-dependent increasing law and whose center is the position of the moving object.

8. Device according to claim 6, wherein the prohibited zone associated with a moving object characterized by its position and by its speed vector is defined by a succession of cylinders, whose centers correspond to the position of the moving object as predicted on the basis of the speed vector, the said centers being spaced apart by a regular time interval p, the radii of the successive cylinders obeying a time-dependent increasing law complying with the following relation: r.sub.i+r.sub.i+1>p where p is the time interval separating the centers of two successive cylinders, r.sub.i and r.sub.i+1 represent the radii of two successive cylinders.

9. Device according to claim 6, wherein the prohibited zone associated with a moving object characterized by its position and by its future flight plan is defined by a tube enveloping the flight plan.

10. Device according to claim 6, wherein the prohibited zone associated with a moving object characterized by its position and by its future flight plan is defined by a rectangular parallelepiped enveloping the flight plan.

* * * * *